United States Patent
Kondo et al.

(10) Patent No.: US 7,088,412 B2
(45) Date of Patent: Aug. 8, 2006

(54) LIQUID CRYSTAL DISPLAY APPARATUS

(75) Inventors: Katsumi Kondo, Mito (JP); Yasushi Tomioka, Hitachi (JP); Takao Miwa, Hitachinaka (JP); Makoto Yoneya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/335,940

(22) Filed: Jan. 3, 2003

(65) Prior Publication Data

US 2003/0133064 A1 Jul. 17, 2003

Related U.S. Application Data

(63) Continuation of application No. 09/423,463, filed as application No. PCT/JP98/02049 on May 8, 1998, now Pat. No. 6,504,591.

(30) Foreign Application Priority Data

May 9, 1997 (JP) .................................. 9-119059

(51) Int. Cl.
  *G02F 1/1337* (2006.01)
(52) U.S. Cl. ...................................... 349/123; 349/124
(58) Field of Classification Search ................ 349/141, 349/123, 124
  See application file for complete search history.

(56) References Cited

U.S. PATENT DOCUMENTS

| | | | | |
|---|---|---|---|---|
| 4,759,610 A | * | 7/1988 | Yanagisawa | ................ 349/162 |
| 5,150,235 A | | 9/1992 | Haim et al. | |
| 5,576,862 A | * | 11/1996 | Sugiyama et al. | .......... 349/124 |
| 5,598,285 A | * | 1/1997 | Kondo et al. | .................. 349/39 |
| 5,650,638 A | * | 7/1997 | Harris et al. | .................. 257/77 |

(Continued)

FOREIGN PATENT DOCUMENTS

EP 0 676 661 A2 10/1995
JP 61-121033 6/1986

(Continued)

OTHER PUBLICATIONS

ASIA Display 95, "S30-2 Development of Super-TFT-LCDs with In-Plane Switching Display Mode", M. Ohta, M. Oh-e, K. Kondo.

(Continued)

*Primary Examiner*—Kenneth Parker
*Assistant Examiner*—David Y. Chung
(74) *Attorney, Agent, or Firm*—Antonelli, Terry, Stout and Kraus, LLP.

(57) ABSTRACT

A liquid crystal display apparatus include a pair of substrates, a liquid crystal layer arranged between the pair of substrates; a plurality of electrodes formed on one substrate, and an alignment control layer formed on a face of at least one of the pair of substrates and being in contact with the liquid crystal layer. An optical characteristic is charged in response to a molecular alignment condition of the liquid crystal layer, and the thickness of the liquid crystal layer is set to a substantially constant thickness by spacers. A surface of the alignment control layer on the at least one of the pair of substrates which is in contact with the liquid crystal layer has stepped difference portions and on a surface formed in a display pixel, an inclination degree of a stepped difference portion in said alignment control layer is less than 1.

11 Claims, 7 Drawing Sheets

U.S. PATENT DOCUMENTS 5,995,186 A * 11/1999 Hiroshi ........................ 349/141
6,091,471 A * 7/2000 Kim et al. ................... 349/124
6,184,957 B1 2/2001 Mori et al.
6,414,737 B1 * 7/2002 Reznikov et al. ........... 349/136

FOREIGN PATENT DOCUMENTS

| JP | 5-196946 | 8/1993 |
|---|---|---|
| JP | 9-101538 | 4/1997 |

OTHER PUBLICATIONS

SID 96 Digest, 8.1: Invited Paper: Wide-Viewing-Angle Displays with In-Plane Switching Mode of nematic LCs Addressed by 13.3-in. XGA TFTs pp. 81-84.

* cited by examiner

LIQUID CRYSTAL DISPLAY APPARATUS

CROSS REFERENCE TO RELATED APPLICATION

This is a continuation of U.S. application Ser. No. 09/423,463, filed Feb. 2, 2000, now U.S. Pat. No. 6,504,591, which is a 371 of PCT application Ser. No. PCT/JP98/02049 filed May 8, 1998 the subject matter of which is incorporated by reference herein.

TECHNICAL FIELD

The present invention relates to an in-plane switching (In-plane switching: IPS) type liquid crystal display apparatus, in which the electric field is applied to a liquid crystal layer in a direction which is substantially parallel to the substrate of the liquid crystal display apparatus when it is operated. More particularly, the invention relates to a large size display panel having an alignment control layer and which exhibits a good productivity.

BACKGROUND OF THE INVENTION

Recently, there has been a strong demand for a liquid crystal display apparatus which has a large size, a wide viewing angle and a multi-color performance. As to the viewing angle characteristic necessary for a large size screen, many definitions exist which call for a range in which the half-tone level is not reversed, a range in which the brightness, the contrast ratio, and the color tone are not varied, etc. In a multi-color display, it is necessary to enhance the respective color re-production, and it is also necessary to drastically improve the viewing angle characteristic according to the above stated definitions. As a liquid crystal display device which is compatible with a wide viewing angle and a large screen size, a combination system (IPS-TFT-LCD) has been proposed in which an IPS liquid crystal layer and a thin layer transistor (Thin layer transistor TFT) are provided (Oota et al, Proceeding of the Fifteenth International Display Research Conference (Asia Display '95; p. 707); and, a monitor system in which a display screen has a diagonal size of 13.3 inches (corresponding to a 15 inch CRT) has also been suggested (Kondo et al, SID '96 Digest No. 8.1).

However, to make practical use of an IPS-TFT-LCD with a screen larger than 17 inches, which will be the main CRT size used in the feature, it is necessary to develop a large size panel having a new structure using a new process. In the conventional techniques, no reference has been made to a method of adding a homogeneous alignment characteristic to a panel having a stepped difference structure, which is the subject matter of the present invention.

In an IPS-TFT-LCD, there is an inherent difficulty in the alignment processing of the display panel. The margin of the alignment processing is narrow in comparison with a conventional type TN (Twisted Nematic) system, particularly in a normally open type TN system (in which a low voltage produces a bright display and a high voltage produces a dark display). There are three main reasons for the narrow margin, as indicated by the following items (1)–(3).

(1) Stepped Difference Structure

In an IPS-TFT-LCD, in principle, it is necessary to arrange many long and narrow electrodes (called inter-digital electrodes) having a size in the order of several microns degree.

Accordingly, a fine stepped difference structure is formed. The size of the stepped difference is determined by the thickness of the electrodes and the shapes of the various kinds of layers which are formed on the electrodes, and, ordinarily, it is more than 0.1 micron. At the upper-most layer of these layers, a high molecular layer, such as polyimide, is formed as an alignment control layer (called an alignment layer). In the conventional mass-production technique, the surface of this alignment control layer is processed according to a rubbing processing technique so that a liquid crystal alignment capability is added. On the other hand, the rubbing cloth used during rubbing processing is constituted by binding narrow fibers having a thickness of substantially 10–30 microns degree, so that every single narrow fiber provides a sharing force in a predetermined direction to a local portion of the alignment layer, whereby a processing for adding the liquid crystal alignment capability is carried out. There is an extremely narrow fiber having a size of several microns degree, however such a narrow fiber can not be used in practice as the rubbing fiber, since some rigidity for adding a certain degree of friction force is required during the rubbing processing. Since the electrode interval in IPS system is 10–30 micron degree, which is the same as the diameter of the above stated fiber, the rubbing in the vicinity of a stepped difference is not carried out fully, with the result that the alignment is disturbed easily. The disturbance in the alignment causes a lowering of the picture quality, such as a rise in the black level and a lowering of the contrast ratio according to the above stated rise, as well as a non-homogeneity in the brightness.

As a method of solving the above-stated problems, a method has been proposed for flattening the surface of the alignment layer, however a complete flattening in this manner invites the following side effects, which result in this method not being of practical use. A first effect is a problem which is caused by a phenomenon in which the spacers used for controlling the thickness of the liquid crystal layer to a constant level are moved easily. Due to movement of the spacers, the spacer distribution becomes uneven and the liquid crystal layer thickness becomes nonhomogeneous, and, accordingly, a non-homogeneity of the brightness results. Further, during movement of the spacer, the surface of the alignment layer is damaged, which causes light leakage. Due to these points, it is necessary to have some degree of stepped difference to prevent movement of the spacers.

Further, to solve the problem concerning spacer movement, it is desirable to form a stepped difference on at least one of the pair of substrates. In a case where the TFT side is flattened, an attempt is made to form the stepped difference on the opposite substrate side. In an IPS system, to effectively employ in-plane switching, it is necessary to form many thin and narrow inter-digital electrodes, and, as a result, many stepped differences are formed on the TFT side substrate. To eliminate the stepped differences it is effective to coat the substrate with a thick organic high molecular layer, however, when a thick insulation layer is formed on the electrodes, it invites a lowering of the effective voltage which is applied to the liquid crystal. As a result, the threshold voltage becomes high, which causes a problem in that, since it is necessary to use a driver having a high withstand voltage, the consumption of electric power becomes high.

Figure 1:
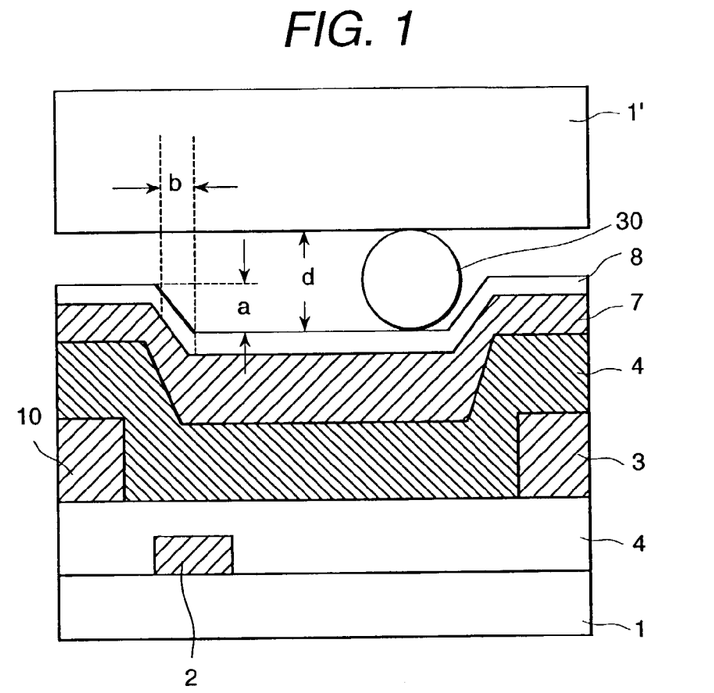
FIG. 1 is a sectional diagram showing an insulation layer, a transparent organic high molecular layer, and an alignment control layer in which a portion of a schematic cross-sectional view of FIG. 2 is enlarged.

It is realistic to form the insulation layer having a proper thickness on the TFT side substrate so as to retain a proper stepped difference. As shown in FIG. 1, it is necessary to provide a ratio a/d between the liquid crystal layer thickness d and the stepped difference a of at least more than 0.02. In particular, for example, to drive a large size panel having a diagonal size of more than 18 inches, and to restrain a deterioration of the voltage waveform from a driver LSI, it is necessary to lower the resistance value of the electrodes; accordingly, the electrode necessarily should be formed so as to be thick. In a large scale panel, a stepped difference necessarily remains.

(2) Alignment Angle

In an IPS-TFT-LCD, it is necessary to establish, in principle, an initial alignment direction to set the direction in which the electrodes are to extend, or by shifting by more than a constant angle from a vertical direction relative to the above-stated direction. Herein, the electrode represents a signal wiring electrode, a common electrode and a pixel electrode in a pixel. To regulate the initial liquid crystal alignment direction by use of a rubbing method, as stated above, it is necessary to rub in a predetermined angle direction using fibers having a size of about 10–30 microns degree, with the stepped difference between the wiring being extended in a constant direction, such as the direction of the signal wiring electrode, the common electrode in the pixel, and the pixel electrode in the pixel and the end portions thereof. However, this causes a problem in that the fibers are drawn in the stepped difference direction from the design angle.

(3) Profound Degree of the Black Level

One of the characteristics of an IPS-TFT-LCD is that the profound degree of the black level (the black display) is good. Accordingly, the disturbance in the alignment comes to the fore in comparison with other systems.

In the conventional normally open type TN system, the dark level is obtained when a high voltage is applied. In this case, under the high voltage condition, almost all of the liquid crystal molecules are directed to the electric field direction, which is a direction vertical to the substrate face. With such a relationship between the liquid crystal molecules and the polarizing plate arrangement, the dark level can be obtained. Accordingly, the homogeneity of the dark level does not depend in principle on the initial alignment condition during the low voltage time. Further, the human eye recognizes the roughness of the brightness as a relative ratio and further reacts with a logarithm scale, and, accordingly, the human eye is sensitive to a fluctuation of the dark level. From the above stated view points, in the conventional normally open type TN system, in which the liquid crystal molecules are arranged compulsively in one direction under a high voltage state, there is an insensitivity to the initial alignment condition, so that it is in a better position. On the other hand, in the in-plane switching system, to display the dark level at the low voltage state or at a voltage of zero, there is a sensitivity to the disturbance of the initial alignment condition. In particular, an arrangement (called a bi-refraction mode) is formed in a homogenous arrangement, where the liquid crystal molecules are aligned in a direction parallel to each other on an upper substrate and a lower substrate; and, also, the light transmission axis of one polarizing plate is formed in parallel to the liquid crystal molecular alignment direction and that of the other polarizing plate is formed orthogonally thereto, so that for a polarization light which is incident on the liquid crystal layer, a linear polarizing light is propagated without a disturbance. This effect is profound at the dark level.

The transmission rate T of the bi-refraction mode is expressed by a following formula (1).

$$T = T o \times \sin^2 \{2\theta(E)\} \times \sin^2 \{\pi \times deff \times \Delta n / \lambda\} \quad (1)$$

Herein, To is a coefficient and is a numerical value which is determined mainly by the transmission rate of the polarizing plate used in the liquid crystal panel, $\theta(E)$ is an angle made by the alignment direction (an effective light axis of the liquid crystal layer) of the liquid crystal molecules and the polarization light transmission axis, E is an applied electric field strength, deff is an effective thickness of the liquid crystal layer, $\Delta n$ is a refraction rate aeolotropic characteristic, and $\lambda$ is the wavelength of the light. Further, herein, a product of the effective thickness deff of the liquid crystal layer by the refraction rate aeolotropic characteristic $\Delta n$, namely (deff×$\Delta n$), is referred to as retardation. Further, the thickness deff of the liquid crystal layer is not the whole thickness of the liquid crystal layer, but when a voltage is applied, it indicates the thickness of the liquid crystal layer in which the alignment direction changes in practice. Because the alignment direction of the liquid crystal molecules at the vicinity of an interface of the liquid crystal layer do not change when the voltage is applied, there is an effect of an anchoring of the interface. Accordingly, when the thickness of the whole liquid crystal layer which is sandwiched by the substrates is expressed by dLC, between this thickness dLC and the thickness deff, a relationship deff<dLC is maintained, and this difference varies according to the liquid crystal material used in the liquid crystal panel and the interface contacting the liquid crystal layer, for example, the kinds of alignment layer materials being used, and it can be estimated to be, in general, 20–40 nm degree.

As clearly understood from the above stated formula (1), the component which depends on the electric field strength is $\sin^2\{2\theta(E)\}$, so that by changing the angle $\theta$ in response to the electric field strength E, the brightness can be adjusted. To form a normally close type, during the voltage non-application time, since the polarizing plate is established to have $\theta=0$ degree, it is sensitive to the disturbance of the initial alignment direction.

(4) Problems of the Photo-Alignment Method

As explained above, as to the problems (1) to (3), it is possible to solve these problems by use of the photo-alignment method in place of the conventional rubbing method. The photo-alignment method is classified largely into two basic types, i.e. a photo-dissolution type and a photoreaction type. In both cases, from a practical point of views, there are the following problems. To provide an improvement in the close adhesion characteristic between the alignment layer material and the substrate, it is necessary to have some degree of thickness, however, in this case, it is difficult to obtain the necessary compatibility between the photo-reaction characteristic and the transparency characteristic. In such a case, bad coloring is evident, and the utilization efficiency of the light and the picture quality are reduced. The assurance of providing a close adhesion characteristic between the alignment control layer and the substrate is important in practical use and is critical to the success or the failure of the photo-alignment.

Further, as stated above, to employ photo-alignment for a substrate having a stepped difference structure, it is necessary to give adequate consideration to the following points. In the photo-alignment method, to a whole face of the alignment layer, the light having an ability for reforming a surface, for example, ultraviolet light, is irradiated. In this case, since a reflection of the light is caused at the stepped difference portion, it is necessary to give consideration to the light path. It is desirable to have a modulated and inclined taper structure as the stepped difference. In a case when the ratio a/b of the parameter shown in FIG. 1 is less than 1 (the inclination angle is less than 45 degrees), the refection light at the taper portion will not reach the pixel portion, and, accordingly, it does not cause an alignment failure.

SUMMARY OF THE INVENTION

An object of the present invention is to provide, in particular, a large size liquid crystal display apparatus, wherein the problem in which the manufacturing margin is narrow in an alignment processing, which is a specific problem in the manufacture of an IPS-TFT-LCD, as stated above, can be solved, and a high picture quality in which the contrast ratio is heightened can be obtained and the generation of a display failure as a result of a fluctuation in the initial alignment direction can be reduced.

According to the present invention, in an active matrix type in-plane switching liquid crystal display apparatus in which at least one of a pair of substrates is transparent, the thickness of the liquid crystal layer is controlled to be substantially constant by use of a spacer which is dispersed and sandwiched between the pair of substrates. Also, on a surface of at least one of the pair of substrates in contact with the liquid crystal layer, the inclination degree a/b of a stepped difference portion having an alignment control layer which is formed on a surface of a display pixel is less than 1. The alignment control layer is made of a material which is able to give a liquid crystal alignment capability according to a polarization light radiation, and the liquid crystal alignment capability occurs has at a vicinity of the stepped difference portion.

According to the present invention, during the formation of the alignment control layer of a panel having a stepped difference structure, the manufacturing margin can be enlarged, and, as a result, it is possible to provide a large size liquid crystal display apparatus in which the initial alignment direction is formed homogeneously and in which a high picture quality can be obtained.

In the conventional rubbing method, the end portion of the stepped difference works as a guide for the rubbing cloth fibers, and so the fibers are drawn in the extension direction of the stepped difference, but do not reach the corner portions of the stepped difference. Accordingly, it is impossible to adequately carry out the alignment processing, and so alignment failure occurs. On the other hand, according to the present invention, since the alignment capability is added by the use of polarization light radiation, regardless of the shapes, polarization light having a constant direction can be radiated to the minute portions, as a result of which the liquid crystal alignment direction is formed homogeneously. Further, the stepped difference structure can be formed at the substrate side having the electrodes group or at the opposed side substrate on which the color filter is commonly formed. In particular, when the black matrix formed at the boundary portion of the color filter is made of a resin material and black color paints, to make this black matrix portion thicker than the pixel portion in which the light is transmitted, the stepped difference is formed easily, and the present invention can work effectively. On the other hand, when the black matrix is made of a metal thin layer material, such as chromium, the black matrix portion will also become relatively thin. In this case, the present invention also can work effectively. Further, an IPS liquid crystal, as clearly understood from the formula (1), since the liquid crystal layer thickness deff for giving the maximum transmission rate differs according to the waveform λ of the light, and since the stepped difference is caused in a case where the liquid crystal thickness deff is changed at every color of the color filter, the present invention can work effectively. Further, when the dielectric rate aeolotropic characteristic is positive and also the angle made by the alignment direction of the electric field non-application time on the alignment control layer and the electric field direction is 45–88 degrees, and when the dielectric rate aeolotropic characteristic is negative and the angle made by the alignment direction of the eclectic field non-application time on the alignment control layer and the electric field direction is 2–45 degree, in particular, the present invention can work effectively.

Further, according to the present invention, in an active matrix type in-plane switching liquid crystal display apparatus in which, between a pair of substrates, at least one of which is transparent, a liquid crystal layer is sandwiched, it is effective when a spacer having a regular characteristic relative to the non-transparent portion of the pixel is formed in place of a dispersed spacer. Such a spacer having a regular characteristic can be formed, for example, according to a standard photo-lithography process. Naturally, since the spacer exists, it is necessary to form a stepped difference having a large size, such as 2–5 microns degree, and it is difficult to adopt the rubbing method.

Further, in particular it is necessary to give consideration to the problems of the close adhesion characteristic between the photo-reaction type alignment layer material and the substrate and the coloring characteristic. As to those problems, they can be solved by interposing a transparent organic high molecular layer, having a thickness greater than that of the alignment control layer, between the alignment control layer and the substrate. It is desirable to have a value of 0.2–3 microns as the thickness of the transparent organic high molecular layer and it is desirable to have a value of 0.01–0.1 microns as the thickness of the alignment control layer. The close adhesion characteristic is further strengthened by the addition of an adhesion promotion agent for heightening the close adhesion of the substrate face and the alignment control layer to the organic high molecular layer. Since the organic high molecular layer has some degree of thickness, this works to reduce the deterioration caused by any temperature change etc. Further, more desirably, when both the alignment control layer and the transparent organic high molecular layer are made of polyimide, since they are the same system materials, the close adhesion characteristic can be further strengthened. When the transparent organic high molecular layer is made of an amorphous material, since the whole face of the layer presents a homogeneous state, a reduction in the deterioration and an improvement in the close adhesion characteristic can be obtained. Further, to form the above stated transparent organic high molecular layer so that it is thick, polyamic acid having a concentration of more than 8% is coated thereon, after which it is desirable to heat it to a temperature where imitation proceeds to some degree, and to form a thin alignment control layer after soluble polyimide or polyamic acid has been coated thereon, it is desirable to heat it to a temperature where the solvent agent evaporates. In case of polyamic acid, it is desirable to increase the temperature to where the imitation proceeds.

BEST MODE FOR CARRYING OUT THE INVENTION

Hereinafter, an example of various embodiments of the present invention will be explained.

EMBODIMENT 1

Figure 2:
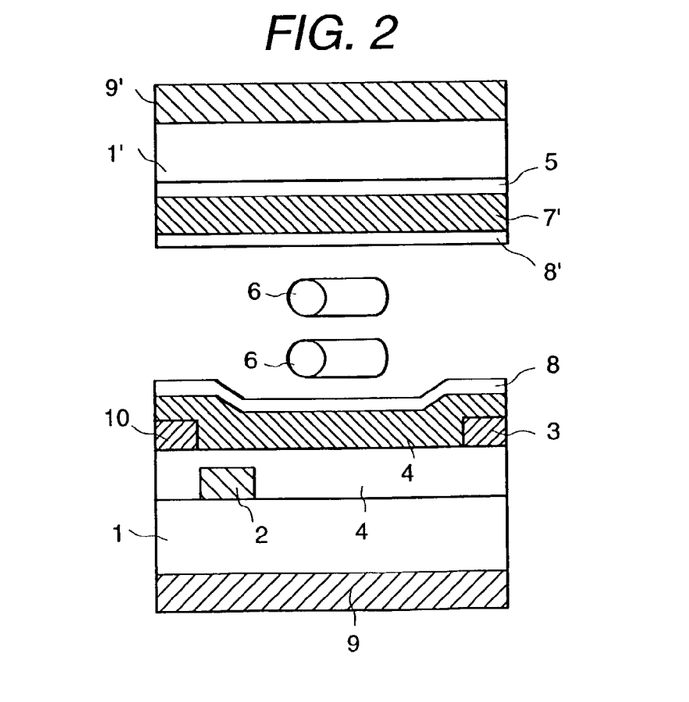
FIG. 2 is a sectional diagram showing a cross-sectional view of a cell of a liquid crystal display apparatus according to the present invention.

In FIG. 2, a schematic cross-sectional view of a cell of a liquid crystal display apparatus of this embodiment is shown. Between a pair of transparent substrates 1, 1' there is disposed a liquid crystal layer 32 composed of plural compounds. In FIG. 2 schematically shows rod shaped liquid crystal molecules 6. On both outer sides of the pair of substrates 1, 1', polarizing plates 9, 9' are arranged. On the inside face of a cell of one substrate 1, stripe shaped electrodes 2, 3 are formed, and above this an insulation layer 4 is formed. Above the insulation layer 4, an alignment control layer 8 is formed. The electrode 2 is a common electrode to which a constant waveform voltage which does not depend on an image signal is applied, and the electrode 3 is a pixel electrode that carries a signal above waveform changes in response to the image signal. Further, at the same level as the pixel electrode 3, an image signal electrode 10 is formed. Both the thicknesses of the pixel electrode 3 and the image signal electrode 10 are 0.2 microns. The insulation layer 4 is formed as two layers, and each of the layers is comprised of silicon nitride and both have a thickness of 0.4 microns. On the opposed substrate 1', a color filter 5 for producing a color display is formed.

FIG. 1 is a schematic view in which the construction at the periphery of the electrode group shown in FIG. 2 is shown in more detail. On the insulation layer 4, which covers the electrodes 3, 10, a transparent organic high molecular layer 7 is coated, and above this, the alignment control layer 8 is coated. The thicknesses of the transparent organic high molecular layer 7 and the alignment control layer 8 are 0.2 microns and 0.03 microns, respectively. In FIG. 1, the stepped difference a is 0.25 microns. Further, the width b of a taper portion is 0.35 microns, and the ratio a/b is 0.71. The thickness d of the liquid crystal layer is 4.0 microns, and the ratio a/d is 0.0625.

To form the transparent organic high molecular layer 7, a polyamic acid solution of PIQ-1800 made by Hitachi Chemical Company Ltd., which is an amorphous layer having a concentration of 8.5%, is coated on the insulation layer 4, after which the solvent agent is dried by heating to a temperature 150° C. for 10 minutes. The polyamic acid solution is a precursor of the alignment control layer 8 and has a concentration of 3%. To the polyamic acid solution made by Hitachi Chemical Company Ltd., as an adhesion promotion agent, 2 weight % λ-amino propyl thriethoxy silane is mixed. Further, as the adhesion promotion agent for promoting the close adhesion characteristic, the invention is not limited to this, but the following materials can be employed. For example, 4-amino phenoxy dimethyl dimarthy vinyl silane, amoni methyl trimethy silane, 2-amino propyl dimethyl ethoxy silane, 3-amino propyl dimethyl ethoxy silane, methyl tris (2-amino ethoxy) silane, 3-amino propyl diethoxy methyl silane can be employed. After that, baking at 200° C. for 30 minutes is carried out and the imidization is carried out. Further, the precursor of the alignment control layer 8 is polyamic acid being a polyimide precursor and as the monomer component as diamine compound matter in which a chemical formula 1 including diazobenzene groups and 4–4' diamino diphenyl methane etc. is mixed with an equal mol ratio is used and to dianhydride compounds pyromellic dianhydride and 1, 2, 3, 4-cyclo butane-tetracarboxylic dianhydrides as the polyamic acid is composed.

chemical formula 1

Further, in this embodiment, azobenzene groups as described in U.S. Pat. No. 4,974,941 are produced and a photo-isomerization reaction characteristic is added, however the invention is not limited this, but can employ a substance having a photo-isomerization reaction characteristic and the liquid crystal alignment is controlled. For example, stilbene groups can be employed. In this embodiment, after two layers of polyimide precursor have been formed, the imidization is carried out according using the heat baking. After that, high molecular beads which are dispersed in methanol and have a particle diameter of 4.2 microns are dispersed in a solution. Since the dispersion medium is alcohol, it can evaporate within one minute, leaving only the spacer beads. The dispersion density is about 100 per 1 $mm^2$ After that, the upper and lower substrates are joined and are assembled to an empty cell condition using a sealing member at a peripheral portion.

Figure 3:
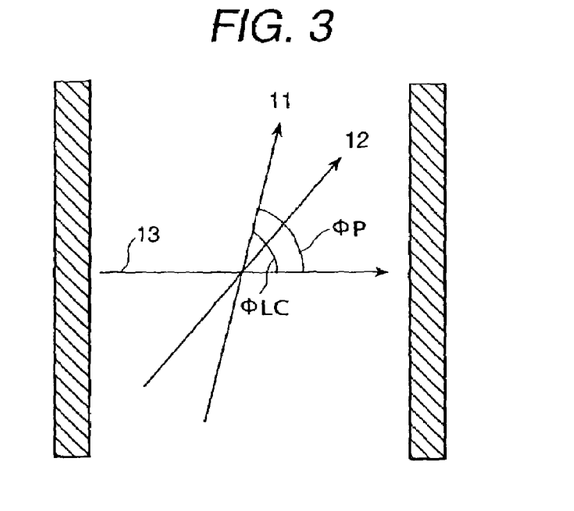
FIG. 3 is a diagram showing an angle formed by a respective liquid crystal molecular long axis alignment direction with an electric field direction and a respective polarizing plate polarization light transmission axis.

After that, under a high pressure mercury lamp having a peak wavelength of 436 nm as a light source, a polarization light is radiated from outside of a cell through a polarization film which transmits light having a wavelength of 400 nm. The radiation luminous energy is about 2J/$cm^2$. After that, the liquid crystal composition matter is encapsulated at room temperature, after which an annealing at 100° C. for 10 minutes is carried out, and the liquid crystal alignment is obtained to a substantially vertical direction relative to the above stated radiation polarization direction. As to the liquid crystal molecular long axis at the obtained alignment condition, an angle φLC which is defined in FIG. 3 is 75 degrees. As stated above, a liquid crystal display apparatus having a thickness d of the liquid crystal layer of 4.0 μm can be obtained. As the liquid crystal composition, nematic liquid crystal is used in which the dielectric aeolotropic characteristic is positive. The value of Δε is 10.2 and the refraction ratio aeolotropic characteristic Δn is 0.073.

Figure 4:
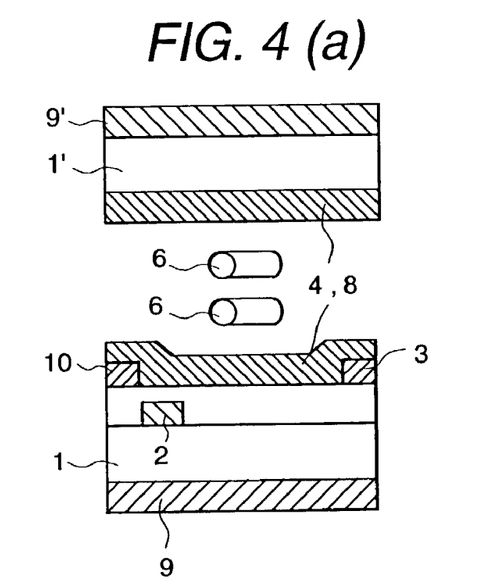
FIGS. 4(a)–4(d) are diagrams showing the principle of operation of the liquid crystal in an in-plane switching system liquid crystal display apparatus.

FIGS. 4(a)–4(d) show the principle employed in switching the liquid crystal molecules in the panel obtained as described above. In this embodiment, as to the liquid crystal molecules 6, during the electric field non-application time, with respect to the vertical direction of the molecules relative to the longitudinal direction of the stripe shaped electrode, φLC=75 degrees, however, when the dielectric rate aeolotropic characteristic is positive, 45 degrees<φLC<90 degrees. The liquid crystal composition, as shown in FIGS. 4(a) and 4(b), also can be formed with a negative dielectric aeolotropic characteristic. In this case, the initial alignment condition is 0 degree≦φLC<45 degrees from the vertical direction of the stripe shape electrode. In FIG. 4(c), an alignment direction 11 is shown with an arrow. Next, as shown in FIGS. 4(b), 4(d), between the electrodes 2, 3, the electric field 13 is applied, thereby to arrange the direction of the electric field 13 in parallel to the molecular long axis, whereby the liquid crystal molecules 6 change direction. At this time, θ in the formula (1) is changed in response to the electric field strength E, and so the transmission rate is changed.

In this embodiment, since a display system having a bi-refraction mode is employed, the liquid crystal is sandwiched between the orthogonal polarizing plates. Further, to obtain a normally open type characteristic which presents a dark display at a low voltage, the polarization transmission axis of one polarizing plate is formed orthogonal to the initial alignment direction. The transmission light strength to be observed is determined by the formula (1).

Figure 5:
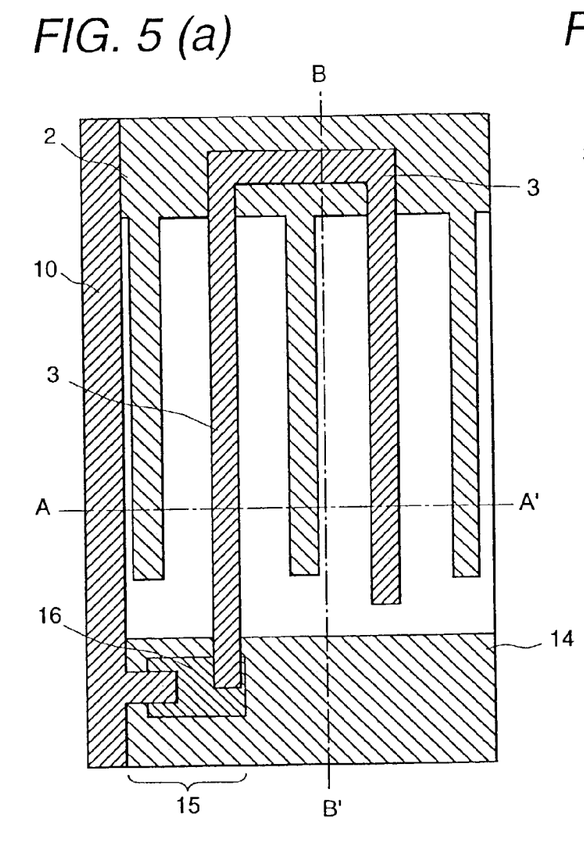
FIGS. 5(a)–5(c) are a plan view and respective side cross-sectional views on lines A–A' and B–B' of an arrangement of an electrode group of a unit pixel portion representing an Embodiment 1, and showing an insulation layer, and an alignment control layer.

FIGS. 5(a)–5(c) show the arrangement of an electrode group, the insulation layer, and the alignment control layer in a unit pixel according to the present invention. FIG. 5(a) is a front view which is viewed from the vertical direction relative to the panel face, while FIGS. 5(b), 5(c) are views showing a respective side face cross-section.

Figure 6:
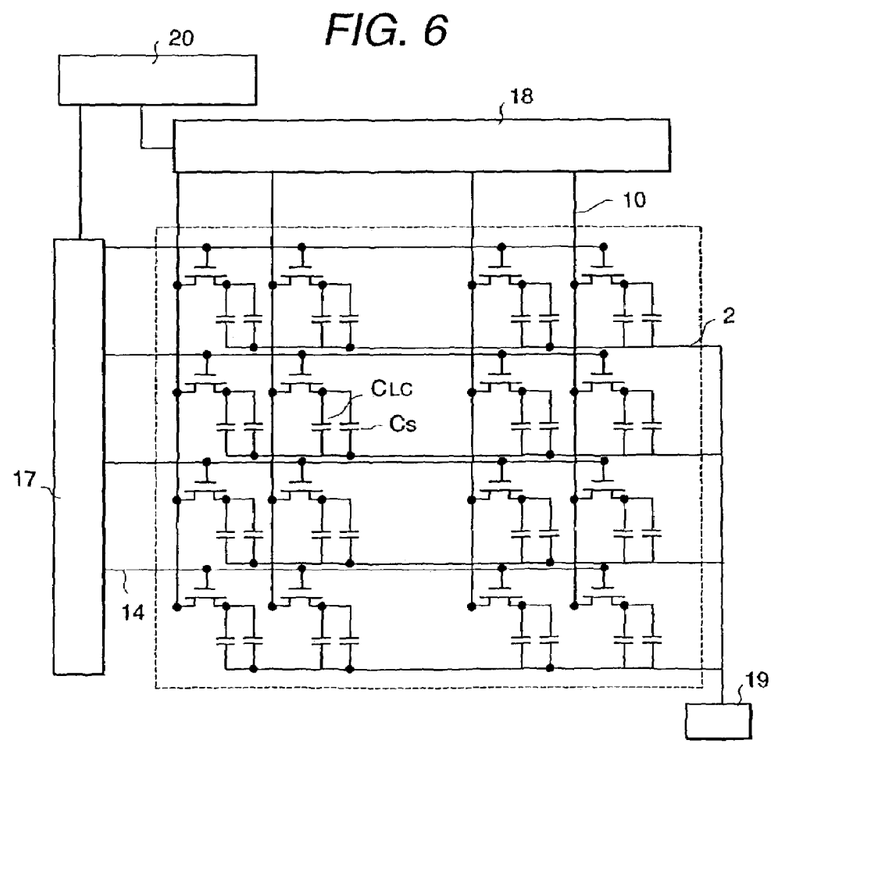
FIG. 6 is a schematic circuit diagram of a liquid crystal display apparatus according to the present invention.

FIG. 6 is a schematic circuit diagram of the liquid crystal display apparatus according to this embodiment. The apparatus is constituted by a vertical scanning signal circuit 17, an image signal circuit 18, a common electrode drive circuit 19, and a power supply and controller 20, however, the present invention is not limited to this structure.

Figure 7:
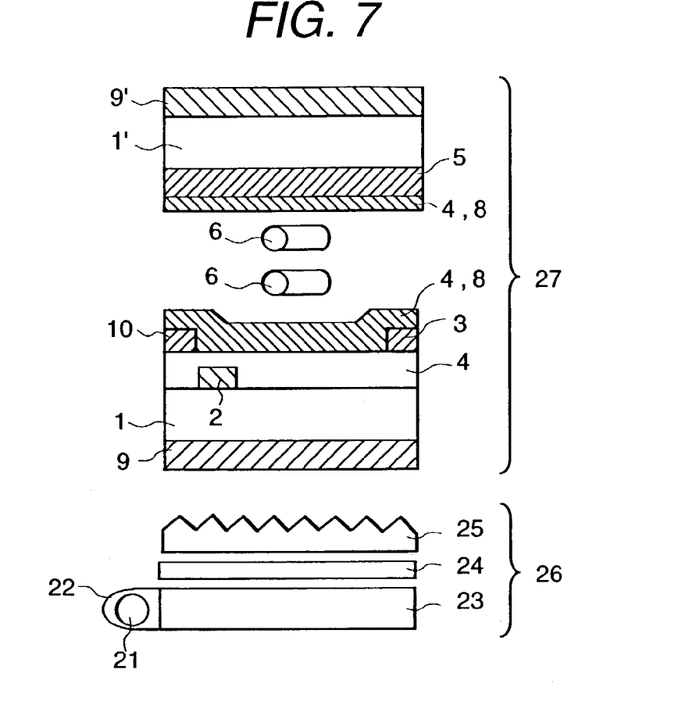
FIG. 7 is a sectional diagram showing an example of an optical system structure in a liquid crystal display apparatus according to the present invention.

FIG. 7 shows the structure of the optical system used in the liquid crystal display apparatus according to this embodiment. To a back face of a liquid crystal panel 27, a back-light unit 26 is provided, and such unit is comprised of a light source 21, a light cover 22, a photo-conductive body 23, and a diffusion plate 24. Herein, a prism sheet 25 for increasing the front face brightness is provided, however, the provision of this sheet is not essential. Preferably, this sheet can be omitted to avoid a reduction of the viewing angle dependency characteristic of the brightness.

With the above stated structure, an IPS-TFT-LCD having a diagonal angle of 13.3 inches and a pixel number of 1.024×RGB×768 was manufactured for trial, and it was found that the contrast ratio exceeds 300 extending over a whole face of the device, and further a liquid crystal display apparatus having a good display homogeneity characteristic was obtained.

COMPARISON EXAMPLE

This example differs merely in that, in place of the photo-alignment method used as the photo-alignment control method in Embodiment 1, the rubbing method is used. As the monomer component, as diamine compounds, 4–4' diamine diphenyl methane is used, but a material having a photoreaction characteristic is not used.

With the above structure, when a IPS-TET-LCD having the same size to Embodiment was manufactured in trial, light leakage accompanying a disturbance of the alignment was observed at the stepped difference portion. As a result, a non-homogeneity of the contrast ratio was observed, and in the low portion it was 80, while in the high portion, it remained at 180 degrees.

EMBODIMENT 2

With respect to Embodiment 1, the following points are different in this embodiment.

Figure 8:
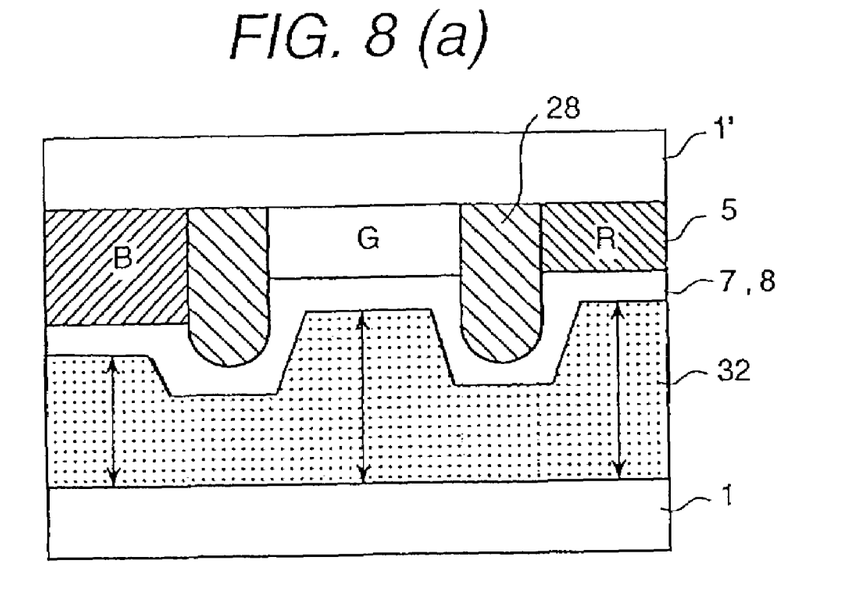
FIGS. 8(a) and 8(b) are sectional views showing one example of a structure in which a stepped difference is provided at a color filter side according to the present invention.

On the other substrate which is arranged opposite to the substrate having the electrode group, a stepped difference structure is added. Further, on this opposite substrate, the color filter is formed and at the boundary portion of the three primary colors of red (R), yellow (Y) and blue (B), a black matrix formed of a mixture of resin material and black color paints is formed. The structure is shown in FIG. 8(a). The thickness of the black matrix is greater than all of the primary colors of the color filter portion. On the black matrix and the primary color portion, similar to the electrode side substrate of Embodiment 1, the alignment control layer 8, to which is added the liquid crystal alignment ability provided by the transparent organic high molecular layer 7 and the polarization light radiation, is coated. Further, as explained with reference to the formula (1), since the liquid crystal layer thickness for giving the maximum transmission rate differs for every color, in this embodiment to make the liquid crystal layer of the blue pixel, which utilizes the light having the short wavelength, then, the thickness of the color filter is formed thick with 0.02 microns degree. In this case, the stepped difference a at the surface of the alignment control layer 8 is 0.5 microns at the maximum. Further, the width b of the taper portion is 0.6 microns and the ratio a/b is 0.83. The thickness d of the liquid crystal layer is 3.3 microns and the ratio a/d is 0.15.

With the above structure, when an IPS-TFT-LCD having a diagonal angle of 13.3 inches and a pixel number of 1.024×RGB×768 was manufactured for trial, the contrast ratio was found to exceed 300 extending over a whole face of the device, and a liquid crystal display apparatus having a good display homogeneity characteristic was obtained.

EMBODIMENT 3

Figure 9:
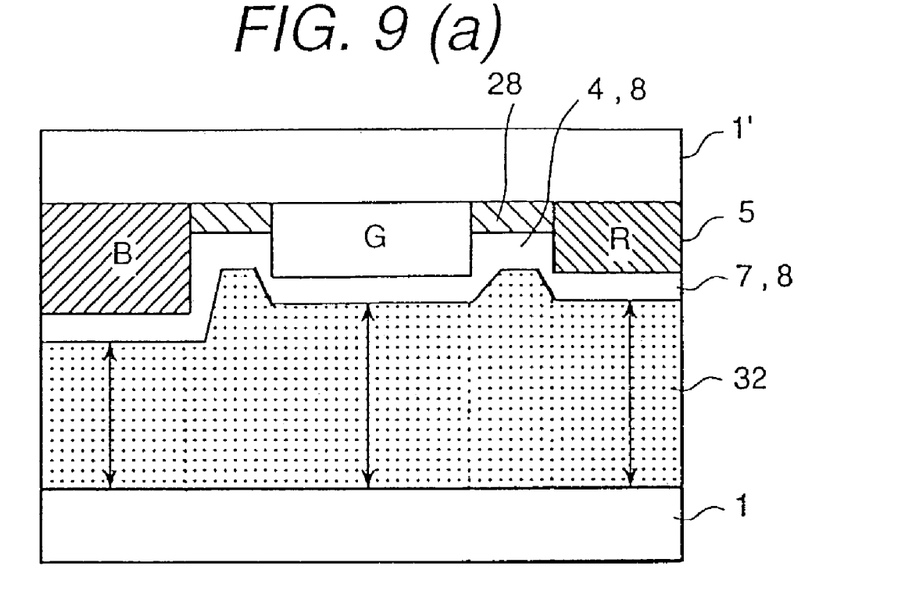
FIGS. 9(a) and 9(b) are sectional views showing another example of a structure in which a stepped difference is provided at a color filter side according to the present invention.
Figure 10:
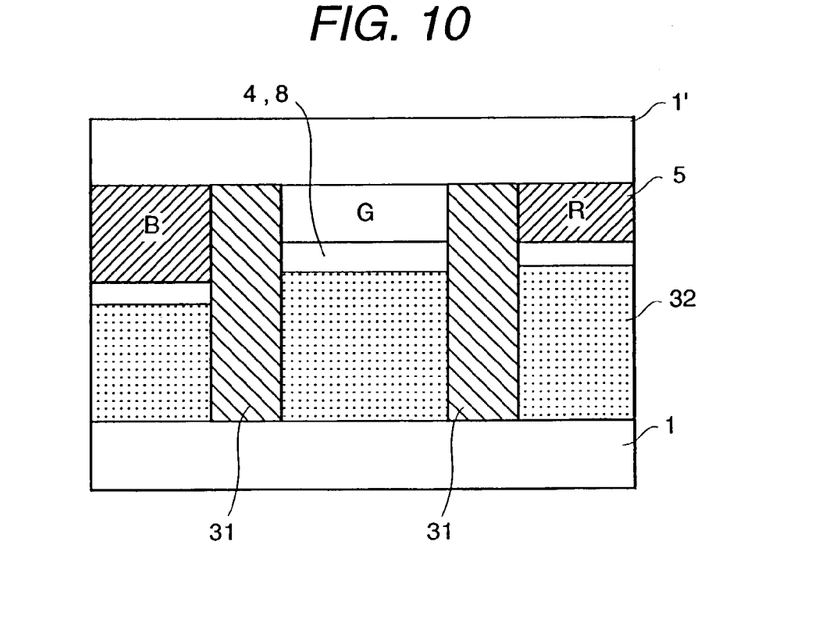
FIG. 10 is a sectional diagram showing one example of a structure in which a spacer is formed to have the regularity to a non-transparent portion of a pixel.

In Embodiment 2, the thickness of the black matrix is thicker than all of the primary colors of the color filter portion, but in this embodiment, in contrast, the black matrix portion is formed as the most thin portion, as seen in FIG. 9(a). The other points except the above are the same as the Embodiment 2. As to the black matrix material, a low reflection type three layered chromium layer is used. In this case, the stepped difference a at the surface of the alignment control layer 8 is 0.15 at the maximum. Further, the width b at the taper portion is 0.8 and the ratio a/b is 0.19. The thickness d of the liquid crystal layer is 4.2 microns and the ratio a/d is 0.036.

With the above structure, when an IPS-TFT-LCD having a diagonal angle of 13.3 inches and a pixel number of 1.024×RGB×768 was manufactured for trial, the contrast ratio was found to exceed 300 extending over the whole face of the device, and a liquid crystal display apparatus having a good display homogeneity characteristic was obtained.

EMBODIMENT 4

In Embodiments 1–3, a spacer of high molecular beads was obtained by dispersion, but in this embodiment, according to the photo-lithography process on the black matrix, pillars having a height of 2.9 microns are disposed with a regularity. The maximum stepped difference a of the pixel portion is 0.15 microns. Further, the width b of the taper portion is 0.20 microns and the ratio a/b is 0.75. The thickness d of the liquid crystal layer is 2.9, which is same as the height of the pillar, and the ratio a/d is 0.052.

With the above structure, when an IPS-TFT-LCD having a diagonal angle of 13.3 inches and a pixel number of 1.024×RGB×768 was manufactured for trial, the contrast ratio was formed to exceed 300 extending over the whole face of the device, and a liquid crystal display apparatus having a good display homogeneity characteristic was obtained.

According to the present invention, the problem of a narrow manufacturing margin of the alignment processing, which is a specific problem in an IPS-TFT-LCD in which the electric field is applied in a substantially parallel direction relative to the substrate, can be solved. Further, at the same time, it is possible to provide a liquid crystal display apparatus having a high picture quality in which the generation of a display failure with a fluctuation of the initial alignment direction can be reduced. Accordingly, in particular, it is possible to provide a large size, high picture quality liquid crystal display apparatus.

What is claimed is:

1. A liquid crystal display apparatus, comprising:
   a pair of substrates, at least one of which is transparent;
   a liquid crystal layer arranged between said pair of substrates;
   a plurality of electrodes formed on one substrate of said pair of substrates for applying an electric field substantially in parallel to a face of said one substrate, and plural active elements connected to the electrodes;
   an alignment control layer formed on a face of at least one of said pair of substrates and being in contact with said liquid crystal layer;
   an optical means for changing an optical characteristic in response to a molecular alignment condition of said liquid crystal layer;
   wherein a surface of the alignment control layer on said at least one of said pair of substrates which is in contact with said liquid crystal layer has stepped difference portions;
   a ratio a/d between a height a of a maximum one of said stepped difference portions and a maximum thickness d of said liquid crystal layer between said pair of substrates on which the alignment control layer having stepped difference portions is provided on at least one of said pair of substrates has a range of 0.02–1;
   a ratio a/b of a taper portion of said stepped difference portions is less than 1, where b is a width of said taper portion; and
   said alignment control layer is made of a material enabling a liquid crystal alignment capability according to a polarization light radiation in a vicinity of said stepped difference portions according to said polarization light radiation.

2. A liquid crystal display apparatus according to claim 1, further comprising an organic layer between said alignment control layer and said substrate.

3. A liquid crystal display apparatus according to claim 2, wherein a thickness of said organic layer is thicker than a thickness of said alignment control layer.

4. A liquid crystal display apparatus according to claim 2, wherein said organic layer is transparent.

5. A liquid crystal display apparatus according to claim 2, wherein a thickness of said organic layer is in a range of 0.2–3 microns.

6. A liquid crystal display apparatus according to claim 1, wherein a thickness of said alignment control layer is in a range of 0.01–0.1 microns.

7. A liquid crystal display apparatus according to claim 5, wherein a thickness of said alignment control layer is in a range of 0.01–0.1 microns.

8. A liquid crystal display apparatus according to claim 2, wherein said organic layer is made of an amorphous material.

9. A liquid crystal display apparatus, comprising:
   a pair of substrates, at least one of which is transparent;
   a liquid crystal layer arranged between said pair of substrates;
   a plurality of electrodes formed on one substrate of said pair of substrates for applying an electric field substantially in parallel to a face of said one substrate, and plural active elements connected to the electrodes;
   an alignment control layer formed on a face of at least one of said pair of substrates and being in contact with said liquid crystal layer;
   an optical means for changing an optical characteristic in response to a molecular alignment condition of said liquid crystal layer;
   wherein a surface of the alignment control layer on said at least one of said pair of substrates which is in contact with said liquid crystal layer has stepped difference portions;
   a ratio a/d between a height a of a maximum one of said stepped difference portions and a maximum thickness d of said liquid crystal layer between said pair of substrates on which the alignment control layer having stepped difference portions is provided on at least one of said pair of substrates has a range of 0.02–1;
   said alignment control layer is made of a material enabling a liquid crystal alignment capability according to a polarization light radiation in a vicinity of said stepped difference portions according to said polarization light radiation; and
   an organic layer between said alignment control layer and said substrate;
   wherein said organic layer is at least a partially imidized layer of a polyamic acid having a concentration of more than 8%.

10. A liquid crystal display apparatus comprising:
    a pair of substrates, at least one of which is transparent;
    a liquid crystal layer arranged between said pair of substrates;

a plurality of electrodes formed on one substrate of said pair of substrates for applying an electric field substantially in parallel to a face of said one substrate, and plural active elements connected to the electrodes;

an alignment control layer formed on a face of at least one of said pair of substrates and being in contact with said liquid crystal layer;

an optical means for changing an optical characteristic in response to a molecular alignment condition of said liquid crystal layer;

wherein a surface of the alignment control layer on said at least one of said pair of substrates which is in contact with said liquid crystal layer has stepped difference portions;

a ratio a/d between a height a of a maximum one of said stepped difference portions and a maximum thickness d of said liquid crystal layer between said pair of substrates on which the alignment control layer having stepped difference portions is provided on at least one of said pair of substrates has a range of 0.02–1;

said alignment control layer is made of a material enabling a liquid crystal alignment capability according to a polarization light radiation in a vicinity of said stepped difference portions according to said polarization light radiation; and an organic layer between said alignment control layer and said substrate;

wherein said organic layer is formed by one of a soluble polyimide having a concentration in a range of 0.2–6% and a polyamic acid which is coated on said substrate and heated to a temperature sufficient for evaporation of at least a solvent agent.

11. A liquid crystal display apparatus according to claim 1, wherein said alignment control layer is responsive to said polarized light radiation so that said liquid crystal layer maintains a uniform alignment when said ratio a/d is within said range.

* * * * *